(12) United States Patent
Schaefer et al.

(10) Patent No.: US 7,089,588 B2
(45) Date of Patent: Aug. 8, 2006

(54) PERFORMANCE PATH METHOD AND APPARATUS FOR EXCHANGING DATA AMONG SYSTEMS USING DIFFERENT DATA FORMATS

(75) Inventors: Robert G. Schaefer, Dayton, OH (US); Harsh Wardhan, Houston, TX (US)

(73) Assignee: Reynolds and Reynolds Holdings, Inc., Dayton, OH (US)

(*) Notice: Subject to any disclaimer, the term of this patent is extended or adjusted under 35 U.S.C. 154(b) by 415 days.

(21) Appl. No.: 09/741,008

(22) Filed: Dec. 21, 2000

(65) Prior Publication Data

US 2002/0010867 A1    Jan. 24, 2002

Related U.S. Application Data

(60) Provisional application No. 60/176,625, filed on Jan. 19, 2000.

(51) Int. Cl.
*G06F 15/18* (2006.01)

(52) U.S. Cl. .......................... 726/22; 709/229; 707/204

(58) Field of Classification Search .............. 707/1–10, 707/104.1, 204; 709/522–523, 229, 250; 711/328; 713/200, 201; 705/27, 4; 726/26, 726/22, 1
See application file for complete search history.

(56) References Cited

U.S. PATENT DOCUMENTS

| | | | |
|---|---|---|---|
| 5,455,948 A | | 10/1995 | Poole et al. |
| 5,521,815 A | * | 5/1996 | Rose, Jr. ...................... 705/28 |
| 5,550,984 A | | 8/1996 | Gelb |
| 5,696,898 A | | 12/1997 | Baker et al. |
| 5,717,919 A | | 2/1998 | Kodavalla et al. |
| 5,737,736 A | | 4/1998 | Chang |
| 5,749,079 A | | 5/1998 | Yong et al. |
| 5,809,478 A | * | 9/1998 | Greco et al. ................... 705/4 |
| 5,890,159 A | * | 3/1999 | Sealby et al. ................. 707/10 |
| 5,893,097 A | | 4/1999 | Hayata et al. |
| 5,899,990 A | | 5/1999 | Maritzen et al. |
| 5,918,229 A | | 6/1999 | Davis et al. |
| 5,966,707 A | | 10/1999 | Van Huben et al. |

(Continued)

FOREIGN PATENT DOCUMENTS

GB    2332604 A  *  6/1999

OTHER PUBLICATIONS

Derfler et al, How Networks Work, Sep. 2000, QUE corporation, Millennium Edition, pp. 70,71.*

(Continued)

*Primary Examiner*—Kim Vu
*Assistant Examiner*—Thomas Gyorfi
(74) *Attorney, Agent, or Firm*—Stephen C. Glazier; Kirkpatrick & Lockhart Nicholson Graham (57) ABSTRACT

Delivery components allow data read, write or operation requests and data responses to pass between a client software application and access components. Each delivery component is developed specifically for each client application. Furthermore, data views (that is, sets of mapping and stored procedures) receive data read, write or operation requests and construct responses, and allow data responses to pass to system domain server components from a target database that is not compatible with the client application. Each set of data views is developed specifically for each target database, and provides virtual compatibility for each target database with each client application. The delivery components and the data views together allow the client application to access the incompatible database through the access components and system domain server components.

33 Claims, 4 Drawing Sheets

U.S. PATENT DOCUMENTS

| | | | |
|---|---|---|---|
| 6,006,201 A * | 12/1999 | Berent et al. ................. 705/27 |
| 6,009,413 A * | 12/1999 | Webber et al. ................ 705/26 |
| 6,021,496 A | 2/2000 | Dutcher et al. |
| 6,029,160 A | 2/2000 | Cabrera et al. |
| 6,041,310 A * | 3/2000 | Green et al. ................. 705/27 |
| 6,061,692 A | 5/2000 | Thomas et al. |
| 6,076,064 A * | 6/2000 | Rose, Jr. ........................ 705/1 |
| 6,076,092 A * | 6/2000 | Goldberg et al. ....... 707/103 R |
| 6,088,796 A * | 7/2000 | Cianfrocca et al. ......... 713/152 |
| 6,094,654 A | 7/2000 | Van Huben et al. |
| 6,115,712 A | 9/2000 | Islam et al. |
| 6,141,759 A | 10/2000 | Braddy |
| 6,167,395 A * | 12/2000 | Beck et al. ..................... 707/3 |
| 6,226,745 B1 * | 5/2001 | Wiederhold ................ 713/200 |
| 6,282,517 B1 * | 8/2001 | Wolfe et al. .................. 705/26 |
| 6,332,163 B1 * | 12/2001 | Bowman-Amuah ......... 709/231 |
| 6,449,618 B1 * | 9/2002 | Blott et al. .................. 707/101 |
| 6,493,752 B1 * | 12/2002 | Lee et al. .................... 709/223 |
| 6,496,935 B1 * | 12/2002 | Fink et al. ................... 713/201 |
| 6,526,403 B1 * | 2/2003 | Lin et al. ........................ 707/4 |
| 6,609,108 B1 * | 8/2003 | Pulliam et al. ............... 705/27 |
| 6,654,726 B1 * | 11/2003 | Hanzek ....................... 705/26 |

OTHER PUBLICATIONS

U.S. Appl. No. 60/041,444, filed Mar. 21, 1997.*
U.S. Appl. No. 60/163,755, filed Nov. 5, 1999.*

* cited by examiner

460 ERA² File: CUSTOMERVO

450 ERA² File Description

470 Application: SHOWR

| (405) | (410) | (415) | (420) | (425) | (430) | (435) | (440) |
|---|---|---|---|---|---|---|---|
| TABLE VIEW | ERA2 FIELD | ERA2 DATA TYPE | COLUMN NAME | COL DATA TYPE | FIELD # | MULTI VALUE | EXT APPLICATION |
| ShowroomSale | | | | | | | |
| | BANK.NAME | Varchar (20) | BankName | Varchar () | 20 | No | OnStar |
| | EXT.CLR | Varchar (10) | ExtClr | Varchar () | 10 | No | OnStar |
| | SER.NO | Varchar (17) | SerNo | Varchar () | 17 | No | OnStar |
| | VEH.NO | Varchar (17) | VehNo | Varchar () | 17 | No | OnStar | flat      SQL      flat      ext. applic.

PERFORMANCE PATH METHOD AND APPARATUS FOR EXCHANGING DATA AMONG SYSTEMS USING DIFFERENT DATA FORMATS

This application claims the benefit of U.S. Provisional Application No. 60/176,625, filed Jan. 19, 2000.

FIELD OF THE INVENTION

This invention relates to data distribution. Specifically, this invention relates to data distribution among computer systems that use different formats to store data.

BACKGROUND OF THE INVENTION

Compatibility of data has eluded organizations whose computer systems need to exchange information with other organizations' computer systems. Many organizations maintain data within their own computer systems in formats and in structures that are unique to their own businesses. As a result, when these computer systems interact with other organizations' computer systems, problems arise due to incompatibility.

Incompatibility may be caused by using incompatible data elements. For example, one system may define a particular data element as alphanumeric, i.e., capable of representing alphabetic or numeric values, while a second system may define the same data element as numeric only. Thus, if the first system transmits the data element with an alphabetic value to the second system, the second system will reject the data element because the data element is not numeric. As a result, the systems are unable to communicate with each other and become incompatible because of incompatible data elements.

In addition to incompatible data elements, the format of files in a computer system may also lead to incompatibility. More computer systems are being developed using newer technology, such as relational databases. On the other hand, many mainframe-based computer systems built in the past, known as legacy systems, use flat files or multi-value files (a type of flat file) rather than relational databases. This disparity in file format leads to incompatibility problems. For example, one file in a computer system may be stored as a relational database, while similar or necessary information may be stored as a flat file in a second computer system. If the first computer system attempts to access (i.e., view and update) the flat file in the second computer system using commands designed for relational databases, such as structured query language (SQL) commands, the second system will reject the attempt because the flat file cannot be accessed using relational commands. The same problem occurs regardless of the type of file structures used in the respective systems, and may also occur in electronic communication involving more than two systems. Thus, the systems are unable to communicate with each other because of incompatible file formats.

Another problem that arises when computer systems exchange information with each other is the possibility of breaches in the security of the computer systems. When a computer system can be accessed by external entities, such as other computer systems, it is vulnerable to security breaches, including data corruption and infection by computer viruses. Thus, there is a need to be able to exchange information among computer systems while maintaining the security of the computer systems.

As the number of entities exchanging information increases, so does the number of different computer systems using different data formats and different file formats. Accordingly, one computer system may be unable to communicate with another computer system due to incompatible data and/or file formats. Thus, there is a need for compatibility among different computers systems, while ensuring the security of the computer systems.

More specifically, client applications have been developed that utilize various database formats to organize information. These systems use format-specific commands to request information from databases. For example, in a relational database, an SQL request extracts information efficiently and quickly. However, there is a problem with this approach. The client applications that utilize a given database format cannot access information from a target database utilizing an incompatible format. This, in turn, results in the need for the client applications or the databases, or both, to be extensively modified to allow communication. Hence, a frustrated need exists to allow client applications to access, such as by viewing and updating, other applications that may utilize incompatible target databases, with no modification of the client application or the target databases.

SUMMARY OF THE INVENTION

The present invention, for the first time, permits client applications 101 to access target databases 117, even when the client application 101 database and the target database 117 have incompatible data structure and format (such as where one is an SQL database, and the other is a flat or multi-valued database), and where the target database is unaware of the nature of the client database. Access to target databases 117 includes reading and writing capabilities. This, for the first time, provides virtual compatibility between any client application 101 and any target database 117.

Figure 1:
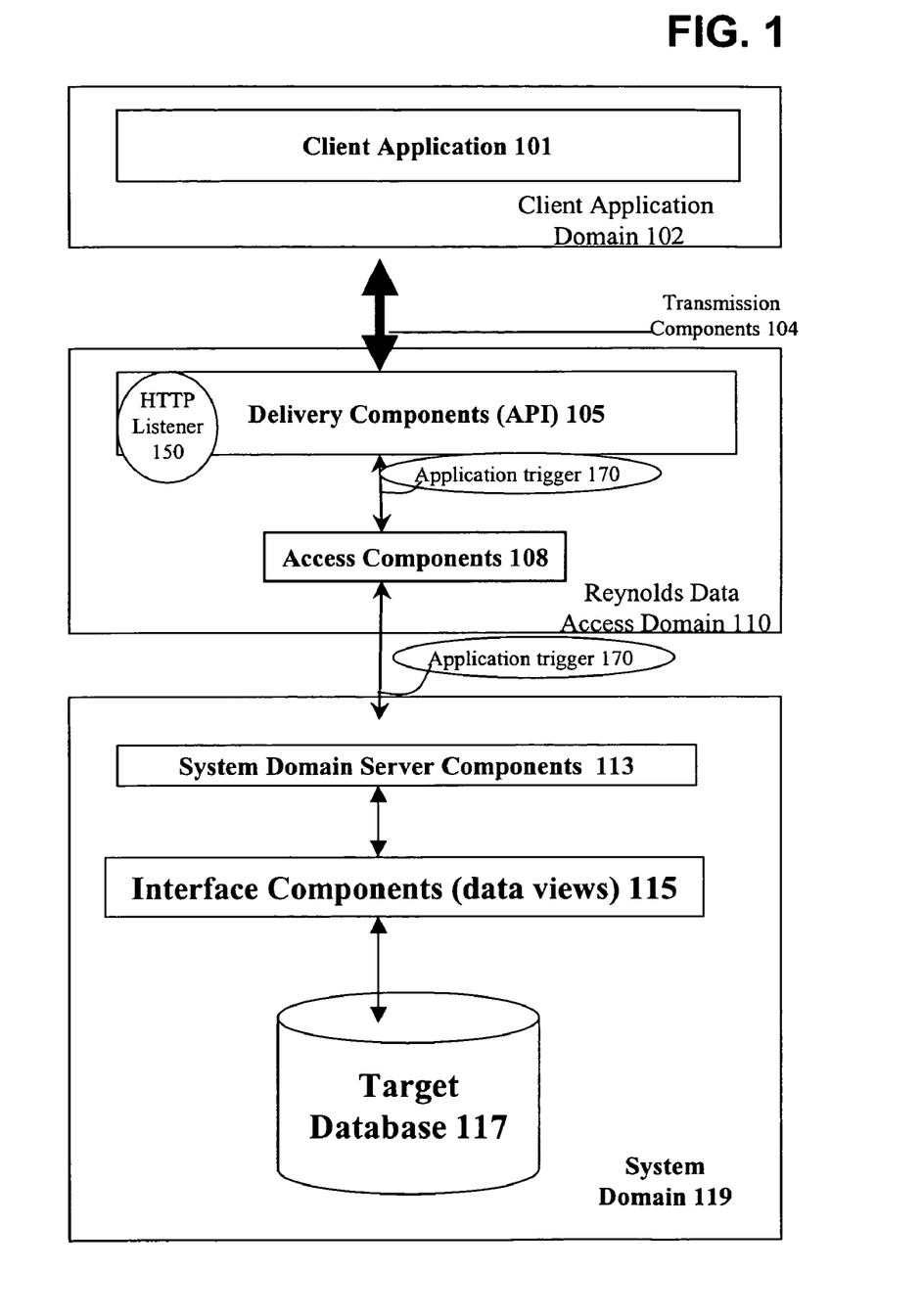
FIG. 1 is a block diagram of a preferred embodiment of the present invention.

The present invention provides delivery components 105 that are application program interfaces (API) that allow computer-to-computer communication, and further allow data read, write or operate requests and data responses to pass between a client application 101 and access components 108. Each API 105 is a layer of computer programs (or "code") developed specifically for each client application 101, and requires no modification of the data format of the client application 101. Furthermore, the present invention provides data views, also called interface components 115 (that is mapping and stored procedures which represent a logical presentation of related data elements), to pass data read, write and operate requests and data responses between system domain server components 113 and a target database 117. Each set of data views 115 is developed specifically for each target database 117 and requires no modification of the data format of the target database 117, for the data views 115 to be able to receive data requests and transmit responses, thus providing virtual compatibility for each target database 117. Hence, as shown in FIG. 1, the delivery components 105 and the data views 115 together allow the client application 101, regardless of the data format that is utilized by the client application 101 and regardless of the data format used by the target database 117, to indirectly access the target database 117, using the access components 108, system domain server components 113 and interface components 115.

An additional client application 101 can be brought into the system and access the target database 117, by developing only new delivery components 105 for that additional client application 101, and no new data views 115 are needed for that additional client application 101 to access a database 117 that already has its data views 115. Also, an additional database 117 can be brought into the system by developing only a new set of data views 115 for that database 117, and no new delivery components 105 are needed for that additional database 117 to be accessed by a client application 101 that already has its delivery components 105.

In one preferred embodiment, a client application 101 makes a data request in SQL format, and receives back any data requested in SQL format. If the client application does not have a native SQL database, any data received by the client application 101 in a data response must be converted to the appropriate format for the client application, which conversion may be done by the delivery component 105 specific to that client application 101.

Interconnectivity by a variety of client applications 101 and target databases 117 is facilitated by wide use of a standardized group of SQL descriptions of databases for information of interest, and the data views 115 map the standard SQL descriptions to any other database organization of a target database 117, or of a database of a client application 101.

It is a further object of the invention to improve the security of computer systems 117 that exchange information with external computer systems 101. External access to data in the computer systems 117 is controlled by using delivery components or API's 105. Only authorized client applications 101 will have access through delivery components 105 to the computer systems of databases 117, and such authorized client applications 101 may be authorized by field, application or transaction. As a result, information is exchanged in real time among computer systems 101, 117 without introducing the risk of data corruption within the computer systems 117 due to unauthorized access.

In addition, because virtual compatibility is achieved between incompatible systems, any number of systems 117 may be interconnected according to this invention, while maintaining the security features of all systems. Moreover, just as incompatible systems 117 may communicate electronically according to this invention, systems 117 that are compatible with each other may also communicate electronically with each other.

DETAILED DESCRIPTION OF THE DRAWINGS

In a preferred embodiment of the invention depicted in FIG. 1, a client application domain 102 comprises a client application 101 communicating electronically with the data access components (API) 105 developed by The Reynolds and Reynolds Company, of Dayton, Ohio ("Reynolds") specifically for that client application 101. For example, a client application 101 may be an OnStar application for General Motors. The client application 101 may also be an RGIS inventory product used to control physical inventory. In addition, the client application 101 may be a WD Net parts locator product on the Internet, a credit software application such as Profit Lease, a car location application, or a service schedule application. Other client applications 101 are insurance company applications, after market store applications, bank applications, motor vehicle agency applications, salvage company applications, supplier company applications, car company applications, retailer applications, consumer applications, Internet-based applications, auction house applications, automotive broker applications, collision repair applications and information broker company applications. These applications may utilize relational databases, flat files or other kinds of file structures, and may use SQL or other commands to access data. The client application 101 may also utilize recently introduced technologies, such as the standard Hypertext Markup Language (HTML) or programming languages such as Java.

The client application 101 could be designed to communicate electronically with the access components 108, but such a communication would require access-specific software, such as ODBC/JDBC software component, to be installed at the client application 101. An alternative to installing such software at the client application 101 is the use of the delivery components 105 (described below).

Electronic communication between the client application 101 and the delivery components 105 may take place, for example, through the Internet, leased telephone lines, wireless connection, local area networks (LANs), wide area networks (WANs), dial-up, combinations of various telecommunication links, a physical exchange of removable media, satellite communication, or other methods.

In one embodiment, various client applications 101, each in a client application domain 102, can all access the data access domain 110. The various client application domains 102 may be scattered in various locations, and access to the data access domain 110 may be made electronically by the Internet, telephone data line, wireless connection, physical exchange of removable media or other methods. The client application domain 102 may reside on a personal computer or any other computing environment, including a "green screen" environment, which is a computer that provides or emulates a basic disk operating system (DOS) environment.

The data access domain 110 may be located remotely from the system domain 119, and the two domains 110, 119 communicate electronically with each other by the Internet, telephone data line, wireless connection, or other methods. In one preferred embodiment, the data access domain 110 resides on the same computer as system domain 119 with the target database 117. Alternatively, the data access domain 110 could also reside on a personal computer that contains the client application domain 102. In other embodiments, the data access domain 110 resides at a third location remote from all client domains 102 and system domains 119, and the access domain 110 acts as a stand-alone service center or operations center.

Multiple system domains 119 can be accessed by the data access domain 110. Hence, the data access domain 110 can act as a central service center between multiple client application domains 102 and multiple system domains 119.

In one embodiment, the system domain 119 resides at the dealer location on the same computer as the ERA product, $ERA^2$ product or $ERA^3$ product, each by the Reynolds and Reynolds Company, or any other Reynolds and Reynolds supported dealer management system (DMS).

In a preferred embodiment, the access components 108 are software applications that allow databases to access other databases. The access components 108 include clients and servers based on the following standards and protocols:

ODBC, JDBC, Java adapter, and OLE DB. For example, the ETools ODBC and ETools JDBC are available from GA eXpress Inc. of Irvine, Calif.

Transmission components 104 are the protocols and standards that enable data requests and responses to be transmitted from one domain to the other. Transmission components 104 comprise the HTTP component support for outbound messages, Java servlets or CGI (common gateway interface) for inbound messages, file transfer protocol (FTP), and socket-based transmission. In addition, Simple Object Access Protocol (SOAP) from Microsoft Corporation of Redmond, Wash. can be implemented as a transmission component 104 if and when SOAP becomes commercially available. SOAP is a protocol for accessing objects on the World Wide Web, and uses XML (extended markup language) syntax to send text commands across the Internet using HTTP.

The delivery components 105 comprise multiple software components and provide interfaces (not shown) that are defined and implemented according to the needs of the client application 101. The delivery components 105 perform several functions, including managing the number of communication connections that are allowed to and from the client application 101, managing the data request queue of information to and from the client application 101, providing security mechanisms to limit system access to authorized client applications 101 only, and controlling the scope of the access to the information in target database 117 that is provided to each authorized user 101. For example, a specific client application 101 may be authorized to access only certain fields of the system 117. The delivery components 105 control the movement of data to and from the client application 101, such that if the client application 101 requests data from an area 117 that the client application has no authority to access, the delivery components 105 will disallow access to database 117 for that data request.

The delivery components 105 may be implemented to accommodate various file formats, based on the specific needs of the client application 101. Thus, the delivery components 105 may be implemented to accommodate XML (extensible markup language), flat files or application specific formats.

In most embodiments, use of the delivery components 105 will require some communication software additions to the client application 101. For example, if a client application 101 requires access to the target database 117 from within a third party product, such as Access or Excel by Microsoft Corporation, the client application 101 will not be provided the ability to update or query the target database 117 directly. Rather, in this example, the client application 101 would use VBScript to create an instance of the Reynolds data access component 105, use the available components 108, 113, and 115 to retrieve data, and program the client application 101 according to the client application's specific needs for processing the data received. Client applications 101 using a web server environment under Microsoft Windows NT likely will use COM or DCOM delivery components 105 (described below) to perform the required data access.

In one embodiment, the delivery components 105 may utilize Open DataBase Connectivity (ODBC), which is a database programming interface standard that provides a common language for Windows applications to access databases on a network, or Java DataBase Connectivity (JDBC), which is a programming interface standard that lets Java applications access databases.

In general, delivery components 105 fall into one of the following categories, depending on the requirements of the client application:

a. Common Object Request Broker Architecture (CORBA) components will provide data access within cross platform environments. CORBA, an industry standard for communicating among distributed objects, provides a way to execute objects that are written in different programming languages, even if these objects run on different platforms. The delivery components 105, when they are CORBA-compatible, will require the deployment of an Object Request Broker (ORB), and can be used in an application environment as well as with services such as web servers.

b. COM/DCOM Components will provide data access within the Microsoft Windows environment. These components can be used in conjunction with applications that support object creation as well as with services and web based applications.

c. Java classes will provide access within cross platform environments where CORBA components are not feasible. In this case, the appropriate Java archive files (JAR) will be distributed.

d. HTTP/HTTPS requests for data and/or to perform operations, such as a SOAP request for data.

In a preferred embodiment, the system domain 119 comprises the system domain server components 113, the interface components 115 (also called "data views"), developed by The Reynolds and Reynolds Company, of Dayton, Ohio ("Reynolds") and the target database 117. The system domain server components 113 communicate electronically with the access components 108, as well as the interface components 115. The system domain server components 113 provide server communication standard components, and may include the ETools ODBC, (available from GA eXpress of Irvine, Calif.), or other servers for access components 108, such as Java Adapter and OLE DB.

The interface components 115 are a customized software package, specifically developed for the target database 117. In one embodiment, the interface components 115 reside on the same computer as the target database 117, an example of which may utilize the ERA product by The Reynolds and Reynolds Company. The ERA product organizes information into a multi-value database, which is a type of flat file. The interface components 115 convert data from one format, such as the format utilized in multi-value databases or flat files, into another data format, in response to data requests.

Each distinct target database 117 in the system of the present invention has its own specific set of data views 115. In one embodiment, the interface components 115 electronically communicate with the system domain server components 113, as well as the target database 117. The data views 115 may receive a data request from the system domain server components 113 in a first data format, such as an SQL relational request, build a response in a second data format from data in the target database 117, and transmit the response back to the system domain server components 113. The data views 115 build the response by extracting the necessary data from the required field in the source file in target database 117 and mapping it into the required field of the proper table in the response. In addition, stored procedures are included within the data views 115 to manipulate or process one or more data fields in the target database 117 where necessary before mapping the data into the response. For example, a stored procedure may concatenate two fields, or perform a calculation upon these two fields, to create a new data value.

The data views 115 are built according to the requirements of the target database 117, which electronically communicates with the data views 115. Thus, for example, if the target database 117 uses the Reynolds ERA$^2$ product, the data views 115 would be customized to function in conjunction with the ERA$^2$ product. Similarly, if the target database 117 uses an Automatic Data Processing, Inc. (ADP) product, or a customized software package developed by the dealer, the data views 115 are customized to function with the particular features of the target database 117.

Using the data views 115, the system processes the request received from the system domain server components 113 by extracting the necessary information from the target database 117, and mapping and processing that data to build a response. As a result, the client application 101 will not directly access the system domain 119, thus eliminating the risk of database corruption in the target database 117. At the same time, the target database 117 may be updated and viewed by a client application 101 with the proper security authorization. Accordingly, virtual compatibility between incompatible systems is achieved, while the security of the computer system 117 is maintained.

Security of the system 117 is further enhanced using HTTP listeners 150, which work in conjunction with application triggers 170.

An application trigger 170 is an event within the system that initiates a client application 101 process. For example, the trigger 170 may be a certain value for a certain data point in a data response to a read data request, or the trigger may be the data request itself. The trigger 170 may activate a client application 101 different from the client application that made the data request.

For example, an auto manufacturer application 101, may request parts inventory data from an auto dealer target database 117. A resulting data response from the target database 117, may contain a quantity of a part in inventory that is low enough to trigger 170 a part order client application 101 at a part supplier.

An HTTP listener 150 is an application component that monitors all HTTP (including virtual private network, or VPN, Internet and Intranet) communication traffic including data requests and data responses at a point in a system to identify any communications that would constitute events that would initiate any triggers 170. The HTTP listener 150 then generates and transmits the appropriate trigger message to the appropriate client applications 101, whenever a trigger event is found. The trigger message that activates a client application may be in itself another data request.

HTTP listeners 150 can be located in any suitable location in the system, but preferably will be at the delivery component 105.

In one preferred embodiment, the HTTP listener may be specifically designed to monitor incoming HTTP communication, hence the name "HTTP Listener." However, the HTTP listener may have other embodiments to monitor communications into or within the system shown in FIG. 1, using any LAN, WAN, or the Internet.

Because the HTTP listeners 150 are constantly monitoring the data transmissions, these HTTP listeners 150 may check the data transmissions for security violations, such as unauthorized access from a rogue client application 101. For example, HTTP listeners 150 may be provided in the delivery components 105 and the interface components 115 to monitor the data transmissions that pass through those components.

Each HTTP listener 150 is capable of monitoring the incoming data transmission to detect the presence of an application trigger 170. When an application trigger 170 is detected by the HTTP listener 150, the application trigger 170 may set in motion one or more events. For example, an application trigger 170 may be transmitted by a client application 101 that configures a car for a potential buyer. Using the client application 101, a salesperson at a car dealer enters configuration information, such as the make, model and features of the car in which the potential buyer is interested. When the salesperson has completed entering the configuration information, the client application 101 generates an application trigger 170. The application trigger 170, upon being detected by the HTTP listener 150, causes several messages to be generated. One message that may be transmitted to the manufacturer's inventory system determines the availability of the specific configuration of the car desired by the potential buyer. Another message that may be transmitted to the bank or other financial entity requests up-to-date quotes on a car loan for the particular car. Yet another message may be transmitted to the dealership's database to determine if the potential buyer qualifies for any special promotions or discounts. Thus, the application trigger 170 causes one or more events to be initiated.

Alternatively, the application trigger 170 may be included in a response from a target database 117, rather than from a request originating from the client application 101. In the example above, one of the events that was initiated by the application trigger 170 is a request to the bank for up-to-date quotes on a car loan. In response to this request, the bank's target database 117 may generate a response that includes an application trigger 170 that causes one or more events to occur. First, the application trigger 170 may generate a response back to the dealership's client application 101 to provide up-to-date quotes on car loans. Second, the application trigger 170 from the bank's target database 117 may also generate a message to the local bank representative whose territory includes the potential buyer's address. The message to the local bank representative will notify that representative regarding a potential bank customer who can be included in the representative's sales calls. Thus, the application trigger 170 can be included in a response from a target database 117.

Further, in FIG. 1, a third party interface 103 may intercept data requests and responses to and from the client application domain 102 and the Reynolds data access domain 110. The third party interface 103 works in conjunction with the client application 101 to generate data requests, and then uses the responses it intercepts from the Reynolds data access domain 110 for third party applications.

Figure 2:
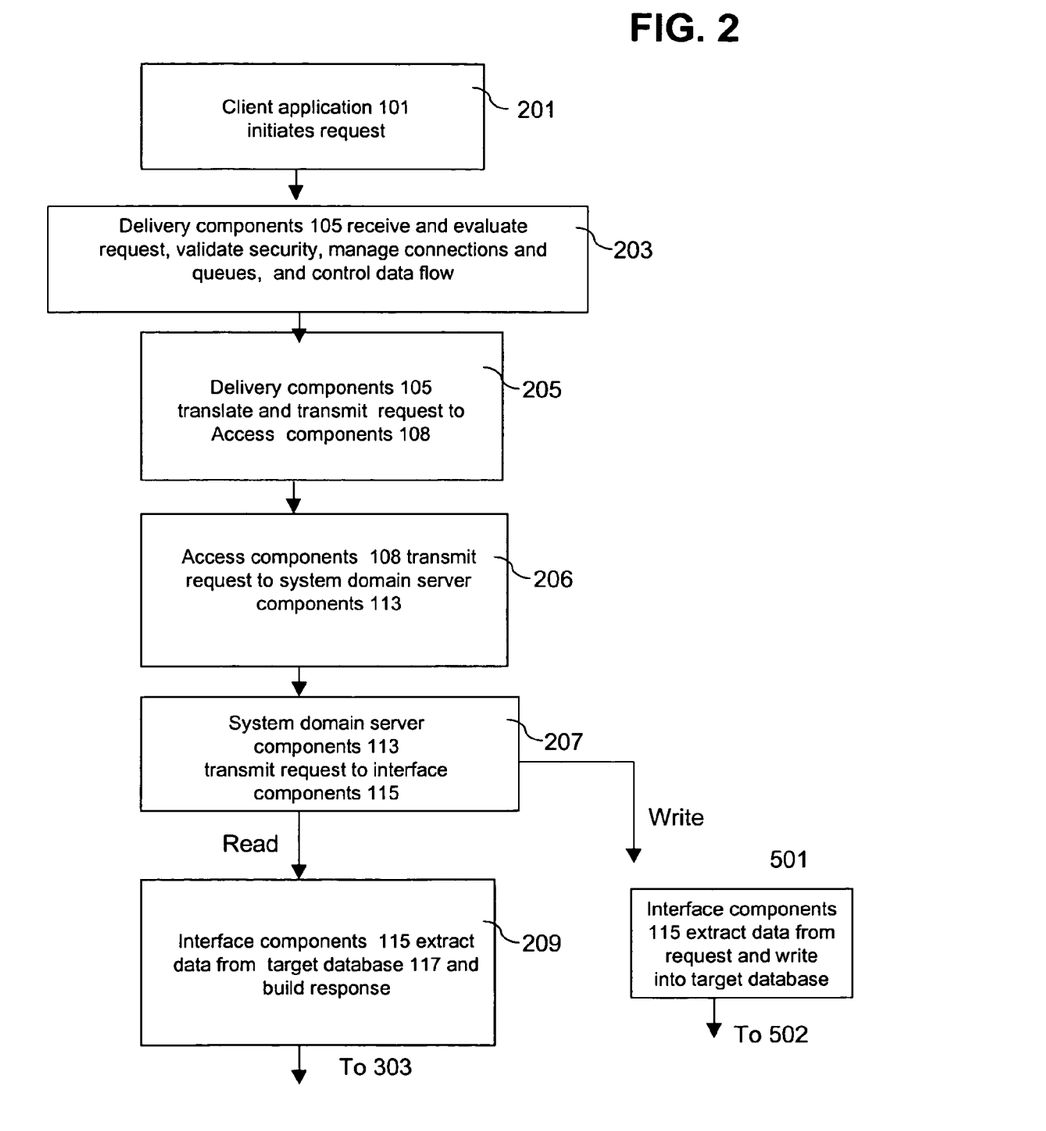
FIGS. 2 and 3 are flow diagrams showing a method according to the present invention.

FIG. 2 shows a flow diagram of an embodiment of the invention. The client application 101 initiates a data request in block 201. The delivery components 105 receive the data request from the client application 101. The delivery components 105 evaluate the data request in block 203. The delivery components 105, for example, determine if the request originated from a valid source 101 to ensure that data access is authorized. In addition, the delivery components 105 manage the communications connections to access domain 110, and the request queue in delivery components 105, which queue is comprised of all requests received by the delivery components 105. The delivery components 105 also control the scope of access to information in database 117 that is provided to the client application 101.

If the request is valid, the delivery components 105 transmits the data request as shown in block 205 to access components 108. For example, an ODBC client may be used if the delivery components 105 operate in a particular computing environment, such as a Windows NT environment, and if the request from the client application 101 is valid, the delivery components 105 transmits the request to the ODBC client. Similarly, a JDBC client may be used if the Reynolds data access component operates in a JAVA environment, and if the request from the client application 101 is valid, the delivery components 105 transmit the request to the JDBC client.

Further, in block 206, the access components 108 transmit the data request to the system domain server components 113.

The system domain server components 113 transmit the request to the data views 115 in block 207.

If the request is a read request, i.e., a request that reads information from target database 117, then the read request is transmitted as shown in block 209. If the request is a write request, i.e., a request that writes information into target database 117, the write request is transmitted as shown in block 501.

The data views 115 receive the read request in block 209. The data views 115 build a response by extracting the necessary information from the target database 117, and performing any needed stored procedures on the extracted data, and then mapping the extracted and processed data into a response. If the read request fails for whatever reason, then a read failure response with diagnostics is generated as a response and transmitted.

In block 501, the data views 115 receive the write request. The data views 115 extract data from the write request and write the data into target database 117.

Thus, even though the client application 101 is incompatible with the target database 117, virtual compatibility between systems 101 and 117 is achieved without modification of database 117 or of client application 101.

Figure 3:
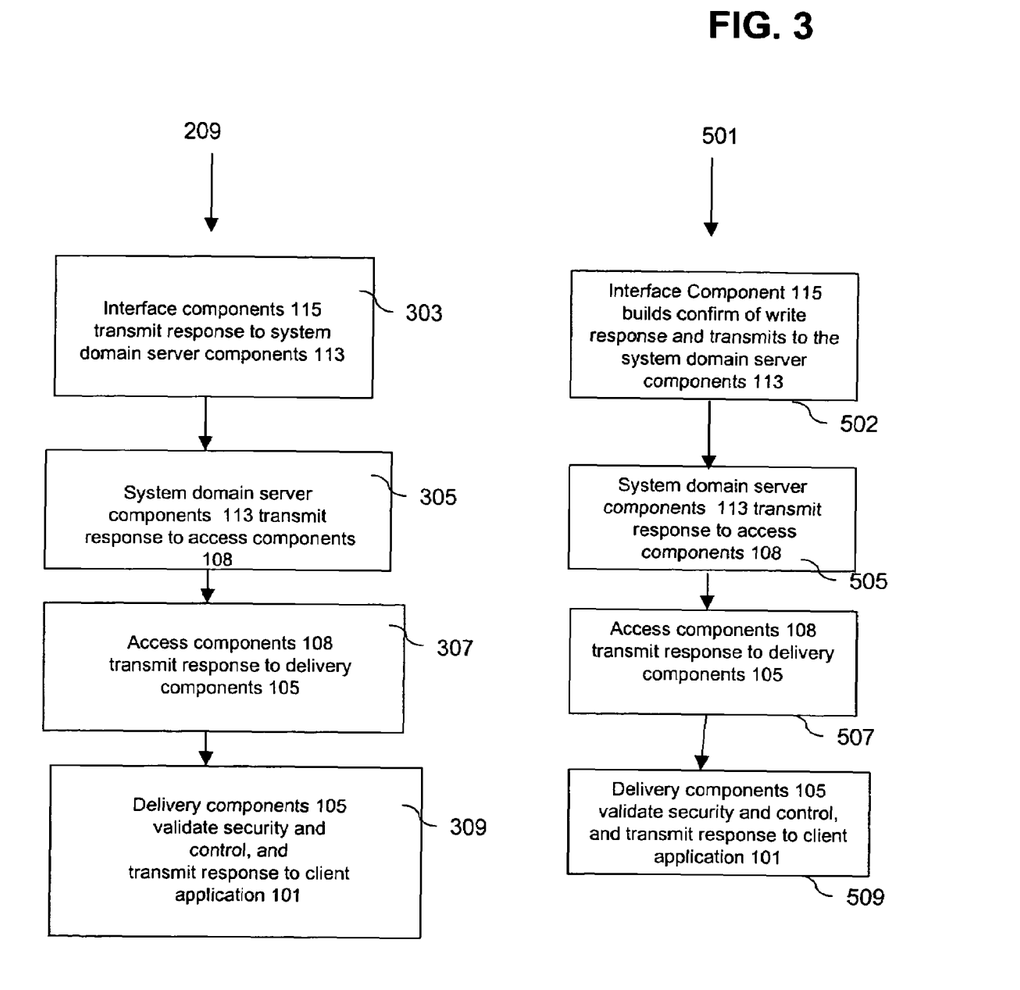

FIG. 3 shows the flow of data from the database 117 back to client application 101. The flow of data in response to a read request is shown beginning in block 303, while the flow of data in response to a write request is shown beginning in block 502.

In block 303, which follows block 209 from the preceding figure, the data views 115 transmit the response to read request to the system domain server components 113.

The system domain server components 113 transmit the response to the access components 108, as shown in block 305.

In block 307, the access components 108 transmit the response to the delivery components 105.

Finally, in block 309, the delivery components 105 validate security and exercise control over the flow of data, and if the response is valid and the client application 101 is proper for that response, then the delivery components 105 transmit the response to the client application 101.

Responses to a write request are transmitted from the target database 117 back to the client application 101 in an analogous data flow. In block 502, which follows block 501 from the preceding figure, the data views 115 build a confirmation notice in response to the write request, and transmits the confirmation to the system domain server components 113. If write request fails (because of the authorization failure or otherwise), then a failure response with diagnostics will be generated as a response and transmitted.

The system domain server components 113 transmit the response to the access components 108, as shown in block 505.

In block 507, the access components 108 transmit the response to the delivery components 105.

Finally, in block 509, the delivery components 105 validate security and exercise control over the flow of data, and if the response is valid and the client application 101 is proper for that response, then the delivery components 105 transmit the data to the client application 101.

Figure 4:
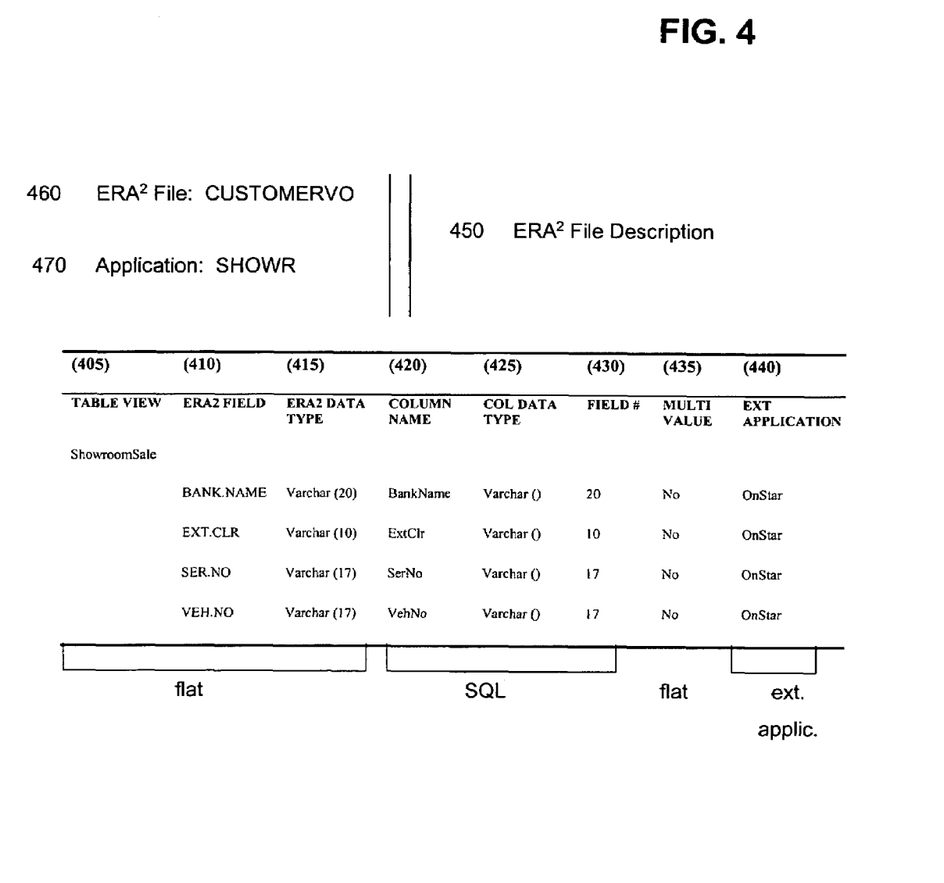
FIG. 4 shows examples of data views according to the present invention.

Examples of data views 115 specifically for the $ERA^2$ database 117 are shown in FIG. 4. While a number of data views 115 are shown in FIG. 4, it should be noted that hundreds of data views 115 are used in a set to achieve the goals of the present invention for each specific target database 117. A distinct data view 115 is developed for each type of data that may be requested.

A data request arrives at the interface components (data views) 115, from an indicated client application 101 indicated as external application 440, and with a target database 117 file description 450, 460, 470. In FIG. 4, the sample data views 115 are for the $ERA^2$ system file 450 as target database 117, specifically $ERA^2$ file CUSTOMERVO 460, and Application SHOWR 470. In addition, the request is from client application 101 indicated as "ext application" 440, in this case OnStar. $ERA^2$ is a traditional multi-valued database, and OnStar has an SQL file structure.

The Data View in FIG. 4 then maps the data from the $ERA^2$ database to the SQL database of OnStar. Within a target 117 file 460, the table view 405 in the file 460, the field 410 within the table 405, the data type 415, within the table 410, and the multi-valve indicator 435, all together define a data location within the flat file schema of table, field, data type, and multi-value character. This is mapped for the data in each row of FIG. 4 to the corresponding SQL organization of column name 420, column data type 425, and field number 430 for the same data in the client application 101, here being OnStar external application 440, which follows the SQL schema of column, data type, and field.

Hence in the example, if OnStar requested read data from $ERA^2$ 450 for CUSTOMERVO 460, and SHOWR 470, from showroomsale 405 for Bankname 410, and VARCHAR (20), in the flat file, then this information would be extracted to populate an SQL response with Bankname 420, VARCHAR 425, and field #20 430, and transmitted to OnStar 440, 101.

Conversely if OnStar 101 requested to write data from SQL OnStar from EXT CLR 420, VARCHAR( ) 425, and field #10, to $ERA^2$ 450, CUSTOMERVO 460 and SHOWR 470, then the SQL incoming data would be mapped to write in and populate the flat target file 117 at EXT.CLR 410, VARCHAR (10) 415, and "No" multi-value 435, in Showroomsale 405.

In summary, the sample data views 115 shown in FIG. 4 illustrate the information that is provided in the data views 115. The table view 405 identifies in which ERA2 table the data field 410 resides on the ERA2 database 117. The ERA2 Field 410 provides the actual name of the ERA2 data field in the code used in the ERA2 product. The ERA2 data type 415 defines the type and length of the data field, and determines how the data field will be interpreted. The column name 420, column data type 425, and field number 430 are used to map the data into an SQL response. The multi-value indicator 435 indicates if a particular field in a flat file can be used to store more than one value. (A multi-value database is one in which more than one value can be stored in one field of the database. It is not a relational database.) The external application 440 identifies an application that interacts with the ERA2 database, whether the ERA2 database receives a read request or a write request.

The Reynolds and Reynolds Company builds a separate set of data views 115 for each specific dealer database product 117. Thus, if client application 101 requests data in terms of its own data name 420, type 425, and field number (#) 420, then the client application 101 does not need to know how the underlying target database 117 is implemented, and will be provided the necessary data mapping in the data view. The target database 117 can be, for example, ERA or ERA² from Reynolds, or with different data view products from ADP, Oracle, IBM, EDS or others.

In one preferred embodiment, the data access domain 110 may reside on a computer and the system domain 119 may reside on another computer that is remote from the data access domain 110, and the system domain 119 may electronically communicate with the data access domain 110 by Internet, leased telephone lines, exchange of removable media or other methods. The client application domain 102 may reside on a computer remote from the data access domain 110 and the system domain 119, and the client application domain 102 may electronically communicate with the data access domain 110 by Internet, leased telephone lines, wireless connection, exchange of removable media or other methods.

Access authorization by a specific client application 101 through the data access domain 110 may be limited to none, some, or all of the system domains 119. Also, access by a client application 101 to a database 117 may be limited by delivery components 105 to only parts of the database 117. Access authorization for a specific client application 101 is verified for a specific target database 117, a specific data element, or even for specific transactions in a client application 101.

In addition, the HTTP listeners 150 provide an additional level of security by checking the data being transmitted. Furthermore, an audit trail is provided by the system to allow tracking of data requests and responses (collectively known as transactions) that are transmitted through the system. The audit trail lists the data requests and responses, as well as other transaction information, such as identification information to identify the source and destination associated with each data request or response.

Which domain 102, 110, 119 specific elements of the present invention 101, 105, 108, 113, 115, 117 may be placed in, can be altered and still remain within the bounds of the present invention. For example, some delivery components 105 may be located in a client application domain 102.

Other collateral services may be provided at the data access domain 110, such as firewall and security services.

While the present invention has been described in connection with what are presently considered to be the most practical and preferred embodiments, it is to be understood that the invention is not limited to the disclosed embodiments. On the contrary, the present invention is intended to cover various modifications and equivalent arrangements included within the spirit and scope of the appended claims.

What is claimed is:

1. A data access domain method executed by a programmable computer, the method comprising:
   (a) receiving, with a programmable computer, read data requests, write data requests, and requests to perform operations from a plurality of incompatible applications remote from said programmable computer, said incompatible applications comprising:
      (i) an insurance application,
      (ii) a bank application,
      (iii) a plurality of vehicle dealer applications corresponding to a plurality of different vehicle dealers, and
      (iv) a motor vehicle agency application;
   (b) transmitting, with the programmable computer, received requests to a plurality of incompatible databases remote from said programmable computer, said incompatible databases comprising:
      (i) an insurance database,
      (ii) a bank database,
      (iii) a plurality of vehicle dealer databases corresponding to a plurality of different vehicle dealers, and
      (iv) a motor vehicle agency database;
   (c) receiving, with the programmable computer, data responses from the plurality of incompatible databases, the data responses corresponding to the transmitted requests from the plurality of incompatible applications;
   (d) transmitting, with the programmable computer, the data responses to the plurality of incompatible applications, each data response being transmitted in a format compatible with the application to which it is transmitted;
   (e) monitoring all received requests and all data responses to identify any request or response that constitutes an application trigger; and
   (f) generating an appropriate application trigger message to activate an appropriate application, among the plurality of incompatible applications, in response to an application trigger.

2. The data access domain method of claim 1 further comprising managing communications connections and request queues.

3. The data access domain method of claim 1 further comprising checking authorization of an application to make a request.

4. The data access domain method of claim 1 further comprising generating an audit list of data requests for tracking transactions.

5. The data access domain method of claim 1 further comprising checking authorization of an application to receive a response.

6. The data access domain method of claim 1 further comprising employing an application interface specific to each of the plurality of incompatible applications.

7. The data access domain method of claim 1 wherein the step of receiving data responses comprises employing software components for allowing databases to access other databases.

8. The data access domain method of claim 1 wherein data responses are received from interfaces specific to the incompatible databases, the interfaces extracting data from appropriate files and fields in the databases and mapping and performing stored procedures upon the extracted data to provide responses to requests.

9. The data access domain method of claim 1, wherein the requests and data responses are transmitted electronically using at least one of: the Internet, leased telephone lines, wireless communication, local area networks, wide-area networks, dial-up, a combination of telecommunication links, satellite communication, and exchange of removable media.

10. The data access domain method of claim 1 wherein said incompatible applications further comprise one or more of: after market store applications, salvage company applications, supplier company applications, car company applications, retailer applications, consumer applications, internet-based applications, auction house applications, automotive broker applications, collision repair applications, and information broker company applications.

11. The data access domain method of claim 1 wherein said incompatible databases further comprise one or more of: after market store databases, salvage company databases, supplier company databases, car company databases, retailer databases, consumer databases, internet-based databases, auction house databases, automotive broker databases, collision repair databases, and information broker company databases.

12. A programmable computing apparatus comprising:
 (a) means for receiving read data requests, write data requests, and requests to perform operations from a plurality of incompatible applications remote from said programmable computer, said incompatible applications comprising:
  (i) an insurance application,
  (ii) a bank application,
  (iii) a plurality of vehicle dealer applications corresponding to a plurality of different vehicle dealers, and
  (iv) a motor vehicle agency application;
 (b) means for transmitting received requests to a plurality of incompatible databases remote from said programmable computer, said incompatible databases comprising:
  (i) an insurance database,
  (ii) a bank database,
  (iii) a plurality of vehicle dealer databases corresponding to a plurality of different vehicle dealers, and
  (iv) a motor vehicle agency database;
 (c) means for receiving data responses from the plurality of incompatible databases, the data responses corresponding to the transmitted requests from the plurality of incompatible applications;
 (d) means for transmitting the data responses to the plurality of incompatible applications, each data response being transmitted in a format compatible with the application to which it is transmitted;
 (e) means for monitoring all received requests and all data responses to identify any request or response that constitutes an application trigger; and
 (f) means for generating an appropriate application trigger message to activate an appropriate application, among the plurality of incompatible applications, in response to an application trigger.

13. The apparatus of claim 12 further comprising means for managing communications connections and request queues.

14. The apparatus of claim 12 further comprising means for checking authorization of an application to make a request.

15. The apparatus of claim 12 further comprising means for generating an audit list of data requests for tracking transactions.

16. The apparatus of claim 12 further comprising means for checking authorization of an application to receive a response.

17. The apparatus of claim 12 further comprising an application interface specific to each of the plurality of incompatible applications.

18. The apparatus of claim 12 wherein the means for receiving data responses comprises software components for allowing databases to access other databases.

19. The apparatus of claim 12 further comprising interfaces specific to the incompatible databases, the interfaces extracting data from appropriate files and fields in the databases and mapping and performing stored procedures upon the extracted data to provide responses to requests.

20. The apparatus claim 12, wherein the requests and data responses are transmitted electronically using at least one of: the Internet, leased telephone lines, wireless communication, local area networks, wide-area networks, dial-up, a combination of telecommunication links, satellite communication, and exchange of removable media.

21. The apparatus of claim 12 wherein said incompatible applications further comprise one or more of: after market store applications, salvage company applications, supplier company applications, car company applications, retailer applications, consumer applications, internet-based applications, auction house applications, automotive broker applications, collision repair applications, and information broker company applications.

22. The apparatus of claim 12 wherein said incompatible databases further comprise one or more of: after market store databases, salvage company databases, supplier company databases, car company databases, retailer databases, consumer databases, internet-based databases, auction house databases, automotive broker databases, collision repair databases, and information broker company databases.

23. A machine readable memory medium comprising:
 (a) means for receiving, with a programmable computer, read data requests, write data requests, and requests to perform operations from a plurality of incompatible applications remote from said programmable computer, said incompatible applications comprising:
  (i) an insurance application,
  (ii) a bank application,
  (iii) a plurality of vehicle dealer applications corresponding to a plurality of different vehicle dealers, and
  (iv) a motor vehicle agency application;
 (b) means for transmitting, with the programmable computer, received requests to a plurality of incompatible databases remote from said programmable computer, said incompatible databases comprising:
  (i) an insurance database,
  (ii) a bank database,
  (iii) a plurality of vehicle dealer databases corresponding to a plurality of different vehicle dealers, and
  (iv) a motor vehicle agency database;
 (c) means for receiving, with the programmable computer, data responses from the plurality of incompatible databases, the data responses corresponding to the transmitted requests from the plurality of incompatible applications;
 (d) means for transmitting, with the programmable computer, the data responses to the plurality of incompatible applications, each data response being transmitted in a format compatible with the application to which it is transmitted;
 (e) means for monitoring all received requests and all data responses to identify any request or response that constitutes an application trigger; and
 (f) means for generating an appropriate application trigger message to activate an appropriate application, among the plurality of incompatible applications, in response to an application trigger.

24. The medium of claim 23 further comprising means for managing communications connections and request queues.

25. The medium of claim 23 further comprising means for checking authorization of an application to make a request.

26. The medium of claim 23 further comprising means for generating an audit list of data requests for tracking transactions.

27. The medium of claim 23 further comprising means for checking authorization of an application to receive a response.

28. The medium of claim 23 further comprising an application interface specific to each of the plurality of incompatible applications.

29. The medium of claim 23 further comprising software components for allowing databases to access other databases.

30. The medium of claim 23 further comprising interfaces specific to the incompatible databases, the interfaces extracting data from appropriate files and fields in the databases and mapping and performing stored procedures upon the extracted data to provide responses to requests.

31. The medium of claim 23, wherein the requests and data responses are transmitted electronically using at least one of: the Internet, leased telephone lines, wireless communication, local area networks, wide-area networks, dial-up, a combination of telecommunication links, satellite communication, and exchange of removable media.

32. The medium of claim 23 wherein said incompatible applications further comprise one or more of: after market store applications, salvage company applications, supplier company applications, car company applications, retailer applications, consumer applications, internet-based applications, auction house applications, automotive broker applications, collision repair applications, and information broker company applications.

33. The medium of claim 23 wherein said incompatible databases further comprise one or more of: after market store databases, salvage company databases, supplier company databases, car company databases, retailer databases, consumer databases, internet-based databases, auction house databases, automotive broker databases, collision repair databases, and information broker company databases.

* * * * *